United States Patent [19]
Ackley

[11] Patent Number: 6,155,490
[45] Date of Patent: Dec. 5, 2000

[54] MICROELECTROMECHANICAL SYSTEMS SCANNING MIRROR FOR A LASER SCANNER

[75] Inventor: H. Sprague Ackley, Seattle, Wash.

[73] Assignee: Intermec IP Corp., Woodland Hills, Calif.

[21] Appl. No.: 09/298,098

[22] Filed: Apr. 22, 1999

[51] Int. Cl.[7] .................................................. G06K 7/10
[52] U.S. Cl. ................................ 235/472.01; 235/462.36
[58] Field of Search ....................... 235/472.01, 462.36; 359/198

[56] References Cited

U.S. PATENT DOCUMENTS 5,867,297   2/1999   Kiang et al. .............................. 359/198

OTHER PUBLICATIONS

"Micromachined Polysilicon Microscanners for Barcode Readers" by Kiang et al., IEEE Photonics Technology Letters, Vo. 8, No. 12, Dec. 1996.
"Improved Polysilicon Surface–micromachined Micromirror Devices Using Chemical–Mechanical Polishing" by Hetherington et al., Sandia National Laboratories, Albuquerque, NM.
"Two–Dimensional Miniature Optical–Scanning Sensor With Silicon Micromachined Scanning Mirror" by Ikeda et al., SPIE, vol. 3008, 0277–786X/97, pp. 111–122.
"Fine Grained Polysilicon Films With Built–In Tensile Strain" by Guckel et al., IEEE Transactions on Electron Devices, vol. 35, No. 6, Jun. 1988.
"Moving The World With Surface Mircromachining" by J. J. Sniegowski, Solid State Technology, Feb. 1996.
"Application of Chemical–Mechanical Polishing To Planarization Of Surface–Micromachined Devices" by Nasby et al., Solid State Sensor and Actuator Workshop, Jun. 1996.
"Multi–Level Polysilicon Surface–Micromachining Technology: Applications And Issues" by J. J. Sniegowski, Proceedings of the ASME Aerospace Division, AD–vol. 52, ASME 1996.
"Intelligent Microsystems: Strategy For The Future" by Smith et al., Semiconductor International, Apr. 1998.
"Analyst Perspective: The Coming Revolution In ICs: Intelligent, Intergrated Microsystems" by Roming, Jr., et al., SEMI Executive Summary Report, Third Quarter 1997.
"Micromachined Adaptive Mirrors" by Gleb Vdovin, Laborator of Electronic Instrumentation, Delft Univ. of Technology, Delft, The Netherlands, Jan. 21, 1999.

*Primary Examiner*—Harold I. Pitts
*Attorney, Agent, or Firm*—O'Melveny & Myers LLP

[57] ABSTRACT

A light beam scanner comprises a light source providing a beam of light and a microelectromechanical systems (MEMS) scanning mirror that reflects the beam of light through a light-transmissive window. A light detector receives the light that is reflected off a target and that passes back through the light-transmissive window. The MEMS scanning mirror oscillates to provide a scan pattern to the beam of light. The MEMS scanning mirror comprises a resonate transducer in order to oscillate the reflective surface to provide a desired scan pattern.

25 Claims, 4 Drawing Sheets

MICROELECTROMECHANICAL SYSTEMS SCANNING MIRROR FOR A LASER SCANNER

BACKGROUND OF THE INVENTION

1. Field of the Invention

The present invention relates to moving beam laser scanners, and more particularly, to microelectromechanical systems (MEMS) that function as a scanning mirror for a laser scanner.

2. Description of Related Art

Optical imaging systems or beam scanners utilize a beam of light that is swept across a target from which information is to be obtained. These devices are commonly used to decipher data symbols printed on objects in order to identify the objects. A conventional bar code symbol typically comprises a one-dimensional or two-dimensional pattern of vertical bars of various widths separated by spaces of various widths. The term "symbology" is used to describe the unambiguous rules specifying the way data is encoded into the bar and space widths. Because the bar and space elements have different light reflecting characteristics, a scanner can convert the bar code symbol into an electrical signal by analyzing the light reflected from the symbol. The electrical signal can then be decoded to recover an alphanumeric representation of the symbol that identifies the object. Bar code symbols of this nature are now in common usage in various types of applications, such as inventory control, point of sale identification, or logistical tracking systems.

The bar code scanner typically uses a light source that is scanned across the bar code field. Because the bar code symbol is often disposed on the object to be identified, it is desirable for the scanner to be included in a hand held or portable device so that the scanner can be brought to the object. A bar code scanner may include an internal electromechanical system that automatically articulates the light source back and forth at a high rate to scan across the bar code field. Such moving beam scanners usually employ either a helium-neon or solid-state laser as a light source. The scanning motion is provided by rotating or oscillating mirrors inside the scanner, which can achieve a typical scan rate of approximately 40 scans per second. Such moving beam handheld scanning devices are advantageous because they require little operator skill and are capable of effectively reading suboptimum quality symbols by employing a large number of scanning attempts in a short period of time.

One drawback of current scanning devices is that the rotating or oscillating mirrors are large, complex, and often involve electromagnetic coils or oscillating motors along with many moving parts. This results in high cost and poor reliability. Furthermore, because the mirrors are large with a substantial amount of mass, there is a brief delay required between an operator's scan prompt and the actual scan. This delay is caused by the inertia associated with the mirror and its moving parts and is reflected in the time required to bring the mirror from a state of rest to the required scan rate. The delay will be readily detected by an operator who will notice the slow starting scan and will perceive this as a sluggish response. The delay will also result in an operator working less efficiently when performing many scan operations.

There are various fundamental limitations associated with reducing the size of conventional rotating or oscillating mirrors. For example, as the mirrors, magnets, and coils are reduced in size, their inertia is also reduced. A restoring force may be employed for the oscillating scan components by using metal springs, torsion elements, or the like, but as the size and inertia is reduced, the resonant frequencies tend to exceed the scan rate. Also, as a spring element is shortened, so is its range of travel, thus elastic limits may be approached well before the spring flexes sufficiently for its intended use. This results in fatigue and early failure and may be susceptible to unwanted vibrations, especially in portable hand held applications. Additionally, standard methods of construction for the conventional mirrors have limits in terms of the size or scale of a design. Thus, there are limitations to the degree of size reduction for conventional rotating or oscillating mirrors and their associated motors, coils, springs, and other required parts.

One area of science that offers significant size advantages, while overcoming the limitations of reducing conventional parts, is microelectromechanical systems (MEMS). MEMS, or the related field of microoptoelectromechanical systems (MOEMS), refers to systems that combine electrical and mechanical components, including optical components, into a package that is physically very small. These systems are generally fabricated using integrated circuit fabrication techniques or similar techniques such as surface micromachining or bulk micromachining. Various sensors and actuators can be built including engines, transmissions, transducers, resonators, and mirrors that are measured in terms of microns. The degree of complexity depends on the number of movable levels or planes that the fabrication technique provides. For example, a two-level system comprises one mechanical level and a stationary ground plane/electrical plane. Each additional level allows an additional mechanical level. By the third level, rotating gears and mirrors can be built and, by the fourth level, transmissions and hinged pop-up mirrors are possible. A common material used is polycrystaline silicon (polysilicon), because of its inherent strength and that it is directly compatible with modern IC fabrication. The devices offer good reliability and durability with tests performed showing over 4 billion cycles and speeds over 300,000 revolutions per minute. Thus, MEMS offer a way to reduce the size of scanning mirrors and accompanying hardware far beyond that possible by conventional methods.

There are many drawbacks concerning current implementations of optical scanners utilizing MEMS devices. For example, the MEMS device may be limited to scanning in only one direction. Also, the method of oscillating the MEMS device may utilize springs, combdrives, or other types of gears and mechanical sliders that add mass and complexity.

Accordingly, it would be desirable to provide a MEMS device that could serve as a scanning mirror for an optical imaging system. The MEMS device would provide a substantially reduced size than mirrors of conventional design and also offer improvements over current scanners using MEMS mirrors. This advantage would provide faster response times and overcome the inertia limitations of prior art. In addition to it being smaller and lighter, the MEMS device offers advantages in terms of being more precise and cost effective due to advantageous manufacturing processes similar to those of microelectronics. Furthermore, the MEMS device would provide increased reliability and lower cost due to the complete system being on a single silicon chip.

SUMMARY OF THE INVENTION

In accordance with the teachings of the present invention, a MEMS scanning mirror for a laser scanner is provided.

The MEMS scanning mirror provides many advantages over conventional scanner mirror designs as well as current implementations of MEMS scanning mirrors. The MEMS scanning mirror is much smaller, quicker, and more precise. Furthermore, the device may be manufactured along with the associated scanner electronics in a similar type of manufacturing process, thus achieving manufacturing time and cost savings and increasing reliability.

In a first embodiment of the present invention, a light beam scanner comprises a light source providing a beam of light through a partially-reflective mirror to a MEMS mirror. The MEMS mirror reflects the beam of light through a light-transmissive window in a defined scan pattern across the desired target. A light detector receives the reflected light that returns through the light-transmissive window and that reflects off the MEMS mirror and the partially-reflective mirror. The MEMS mirror may be formed as part of the scanner electronics.

In a second embodiment of the present invention, a light beam scanner comprises a light source providing a beam of light to a MEMS mirror that reflects the beam of light through a light-transmissive window in a defined scan pattern to a desired target. A light detector receives the light reflected from the target back through the light-transmissive window. The light detector may be disposed adjacent to or centrally around the MEMS mirror.

The MEMS mirror oscillates using a resonate transducer. The oscillations are controlled by the use of a DC voltage source and preferably oscillate in one direction in a controlled rate or in a first direction at a first rate and in a second direction at a second rate that is substantially higher than the first rate in order to provide a scan pattern. The MEMS mirror may comprise a portion of the scanner electronics.

In a third embodiment of the present invention, a method of generating a scanning beam of light comprises the steps of providing a beam of light and reflecting the beam of light off a MEMS resonant transducer, having a reflective surface and oscillating at a controlled rate by application of a DC voltage, and through a light-transmissive window to an area of interest. The final step is receiving the reflected light from the area of interest.

A more complete understanding of the laser scanner utilizing a MEMS scanning mirror will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

Figure 1:
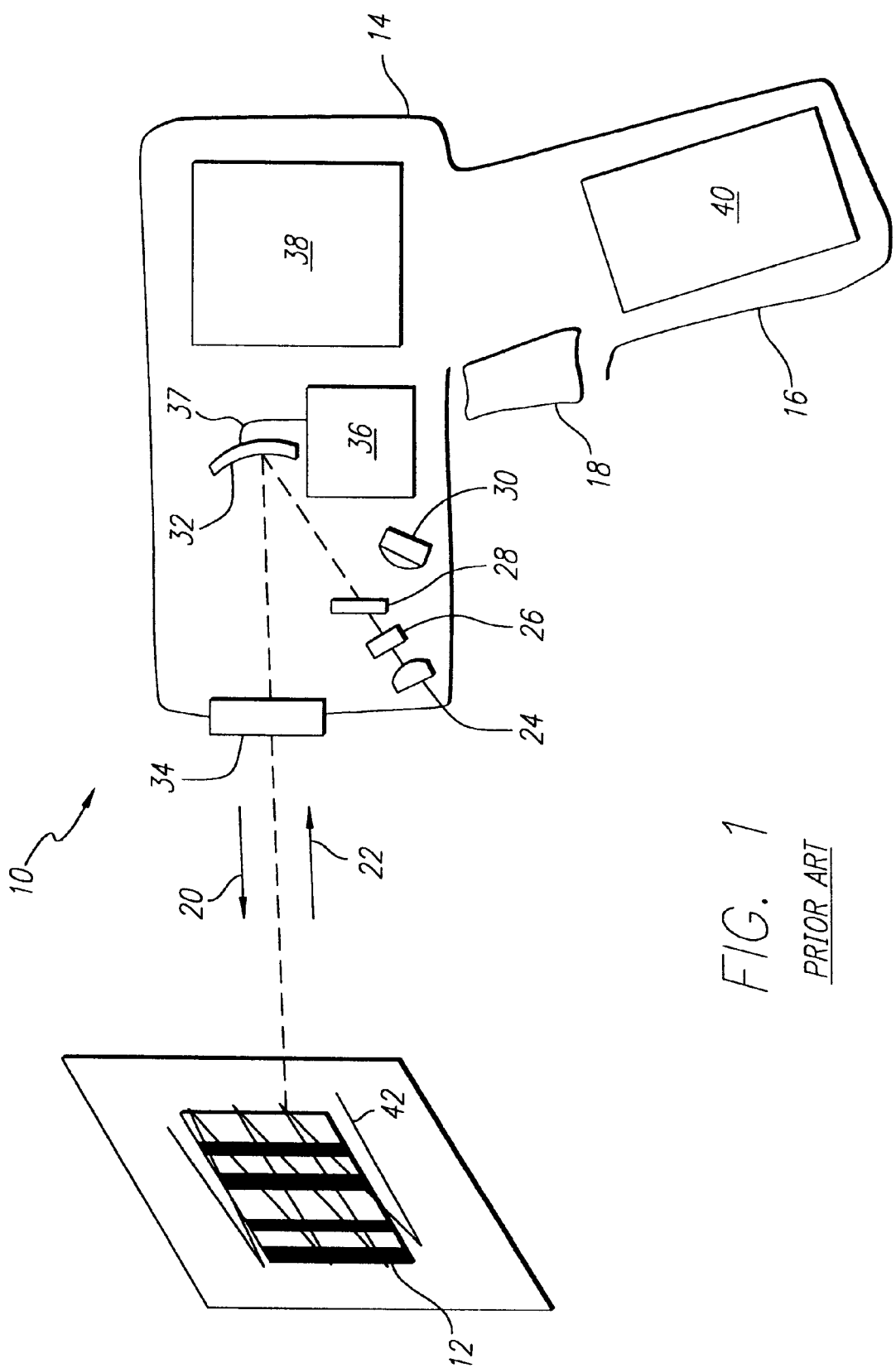
FIG. 1 is a simplified diagram of a prior art scanner.

The present invention satisfies the need for a microelectromechanical systems (MEMS) scanning mirror for a laser scanner that is substantially smaller than mirrors of conventional design. The MEMS scanning mirror would be quicker, lighter, and more durable than conventional mirrors. Furthermore, combining system functions on a silicon chip may significantly reduce manufacturing and assembly time and costs. In the detailed description that follows, it should be appreciated that like reference numerals are used to identify like elements illustrated in one or more of the figures.

Referring first to FIG. 1, a simplified diagram of a prior art scanner 10 is illustrated. The scanner 10 is shown as being a portable, hand-held device for reading a bar code symbol 12. The scanner 10 has a gun-shaped housing 14 having a pistol-grip handle 16. A movable trigger 18 located on the pistol-grip handle 16 allows an operator to activate a light beam 20 when the operator aims the scanner 10 at the intended bar code symbol 12. The scanner 10 contains a laser light source 24, a lens 26, a partially-silvered mirror 28, an oscillating mirror 32, a motor 36, a mechanical linkage 37, a light-transmissive window 34, and a laser light detector 30. The laser light source 24 may, for example, be a semiconductor laser. A semiconductor laser, as opposed to other types of laser light sources, generally offers advantages in terms of its size, low cost, and low power requirements. The associated electronics, signal processing, control, and detection circuitry reside within an electronics package 38. The scanner 10 may also contain a battery source 40 to provide a power source and to increase portability.

In operation, an operator activates the scanner 10 by engaging the movable trigger 18 after aiming at the bar code symbol 12 that is typically several inches from the scanner 10. This causes the laser light source 24 to generate a laser light beam 20 along an axis of the lens 26 and that passes through the partially-silvered mirror 28. The laser light beam 20 then strikes the oscillating mirror 32 that is driven by the motor 36 through the mechanical linkage 37. This results in the laser light beam 20 directed in a scanning pattern 42 through the light-transmissive window 34, as shown traced across the bar code symbol 12. Typically, the motor 36 begins to drive the oscillating mirror 32 after the operator engages the movable trigger 18. The time required for the motor 36 to bring the oscillating mirror 32 up to the proper oscillating speed results in the time delays discussed above.

The scanning pattern 42 represents a predetermined pattern, such as a linear raster scan. The scan can be one or two-dimensional depending upon whether the oscillating mirror 32 oscillates in just the horizontal or in both the horizontal and vertical directions, as known in the art. A laser light beam 22 represents the laser light from the laser light beam 20 that is reflected from the bar code symbol 12. The laser light beam 22 returns to the scanner 10 along a path parallel to, or at times coincident with, the laser light beam 20. The laser light beam 22 passes through the light-transmissive window 34, reflects off the oscillating mirror 32, and then strikes the partially-silvered mirror 28. The partially-silvered mirror 28 reflects the laser light beam 22 onto the laser light detector 30 that converts the laser light beam 22 into electrical signals for processing by the associated detection circuitry located on the electronics package 38. The electronics package 38 processes and decodes the reflected signal from the bar code symbol 12 to retrieve the encoded information. The information contained within the bar code symbol 12 can be retrieved using the laser light beam 22 because the reflected light has a variable intensity over the scan due to the bar elements reflecting less light than the intervening spaces between the bar elements. The electronics package 38 further controls operation of the motor 36 in order to adjust the defined scanning pattern.

Figure 2:
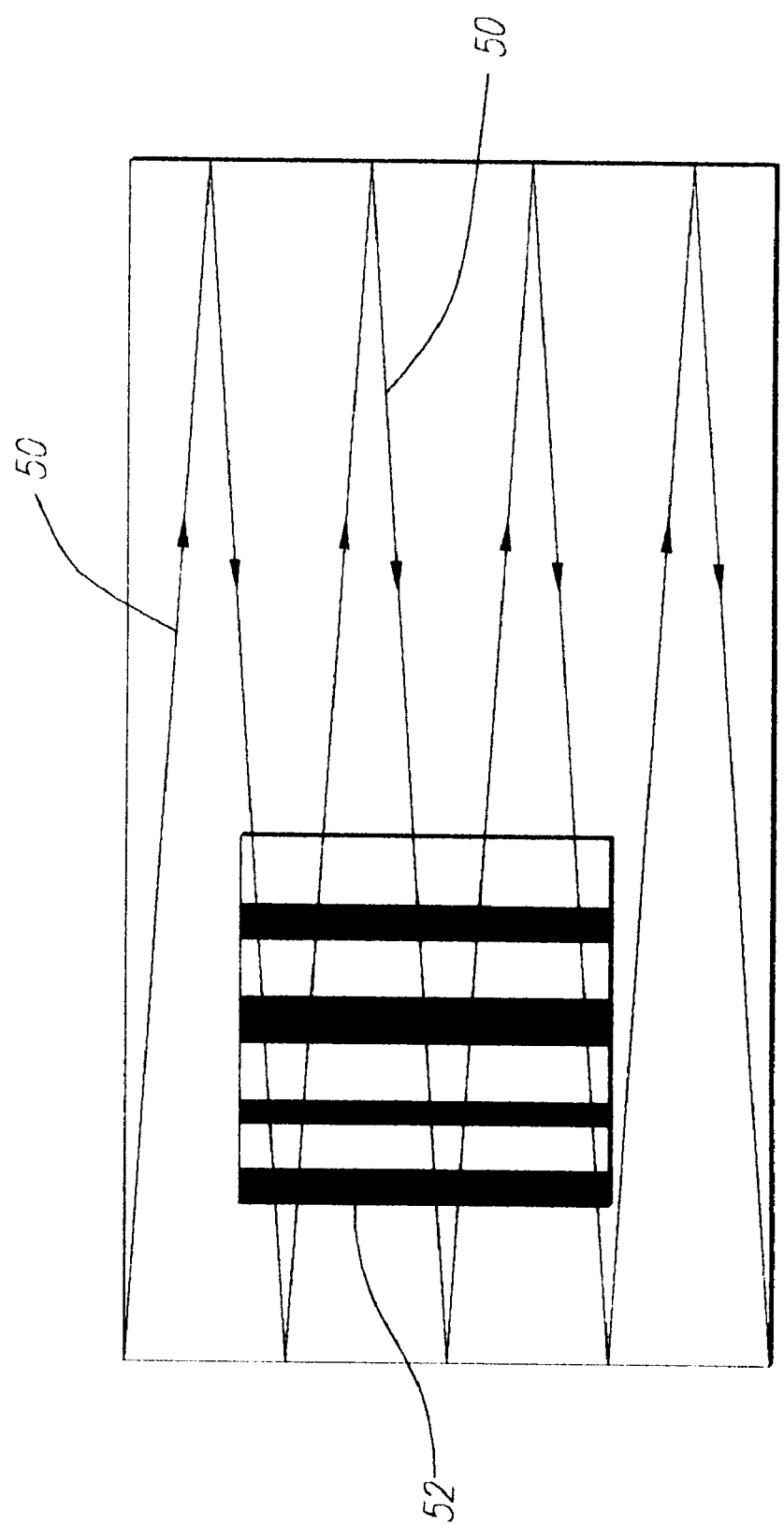
FIG. 2 illustrates a typical raster pattern of the laser beam on a target area.

FIG. 2 illustrates a typical raster pattern 50 of the laser light beam on a target area. The target area is shown as being a bar code symbol 52. The target area may comprise one or two-dimensional bar code symbols, as known in the art, with the specific arrangement of symbols or bars specified by the code or "symbology" used. For simplicity, the raster pattern, as illustrated in the figures, is a coarse pattern. An actual raster pattern generated by a laser scanner would generally be considerably finer to make certain that all of the information of the bar code symbol 52 is scanned.

Figure 3:
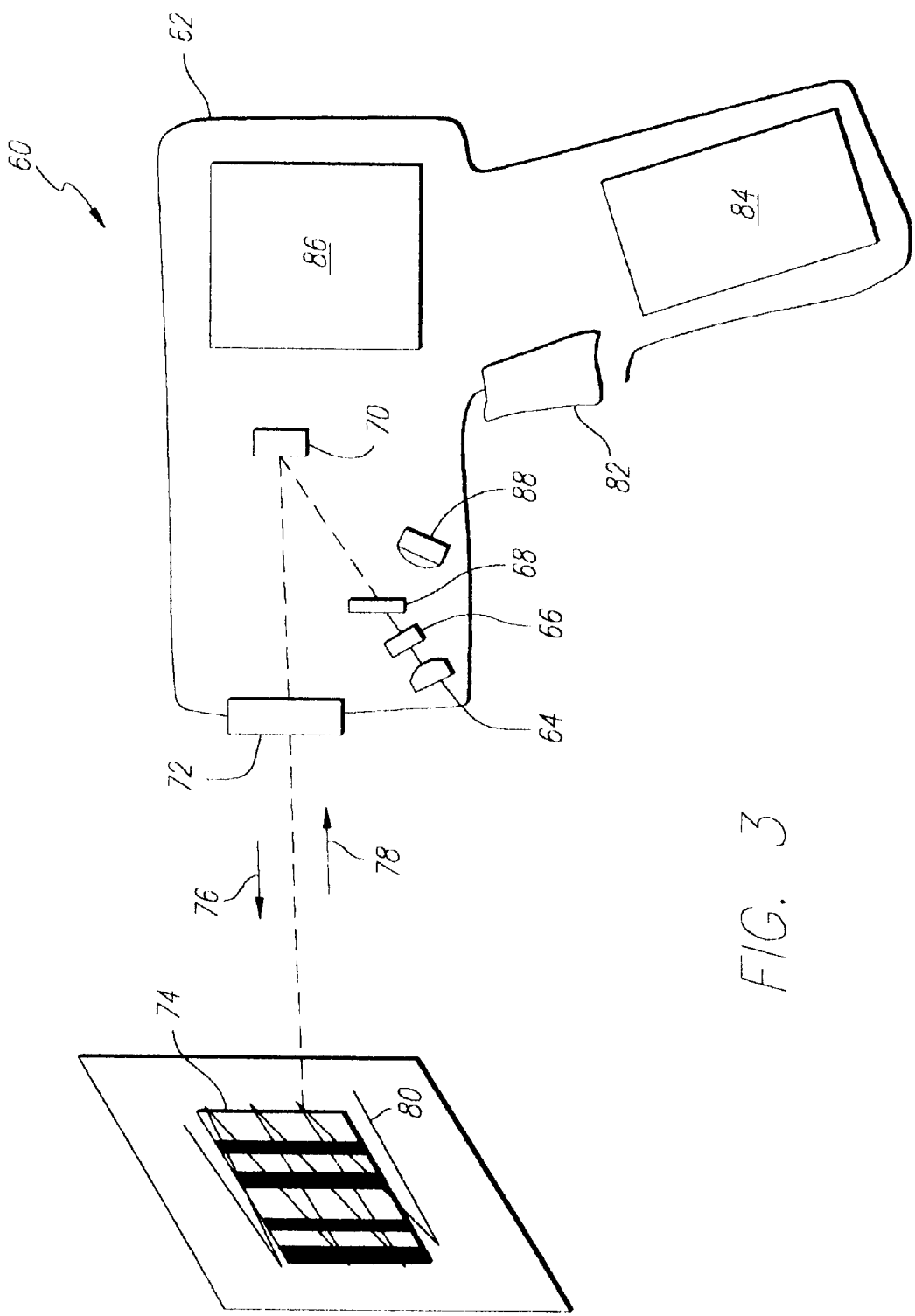
FIG. 3 is a diagram of a laser scanner in accordance with a first embodiment of the present invention.

Referring now to FIG. 3, a diagram of a scanner 60 in accordance with a first embodiment of the present invention is illustrated. The scanner 60 has a housing 62 containing a laser light source 64, a lens 66, a partially-silvered mirror 68, a MEMS scanning mirror 70, a light-transmissive window 72, and a laser light detector 88. The lens 66 may or may not be required, depending upon the degree of focus provided by the laser light source 64. A trigger 82 located on the housing 62 allows an operator to activate a light beam 76 as the operator aims the scanner 60 at an intended bar code symbol 74. The housing 62 also contains a power source 84 and scanner electronics 86. It should be understood that the present invention is applicable to fixed and portable scanners, as known in the art.

The scanner 60 operates similar to conventional scanners, such that, when the operator engages the trigger 82, the laser light source 64 emits a laser light beam 76 that travels through the lens 66 and the partially-silvered mirror 68. The laser light beam 76 is reflected off the MEMS scanning mirror 70 that is oscillating to provide a scan pattern 80 that travels through the light-transmissive window 72 and is shown traced across a bar code symbol 74. A laser light beam 78 is reflected from the bar code symbol 74 and travels through the light-transmissive window 72, is reflected off the MEMS scanning mirror 70 and the partially-silvered mirror 68, and onto the laser light detector 88. The laser light detector 88 converts the laser light beam 78 into electrical signals for processing by the scanner electronics 86.

As can be seen, the MEMS scanning mirror 70 replaces the large oscillating mirror and associated motor and drive electronics of prior art. The MEMS scanning mirror 70 may be separate from or manufactured as part of the scanner electronics 86. The MEMS scanning mirror 70 comprises a resonate transducer, as known in the art. This device can be made to resonate at a desired frequency, either in one direction or in two directions. The resonate transducer may use a mechanically free beam of polysilicon and may also be positioned on thin membranes or diaphragms, cantilevers, and other flexure type mechanisms. The resonant frequency may be induced electronically by the scanner electronics, as known in the art.

The devices will have a polished or highly reflective surface such as a silvered surface. Therefore, the MEMS scanning mirror 70 having a mirrored surface and resonating at a controlled frequency in the horizontal and vertical direction, can produce a rastering scan pattern when a laser light source is reflected from its surface. As an example, the mirrored surface may be a 0.3 mm silvered surface and the applied voltage may be in the 12 volt range that would result in oscillations of approximately 500 Hz by 10 Hz.

Figure 4:
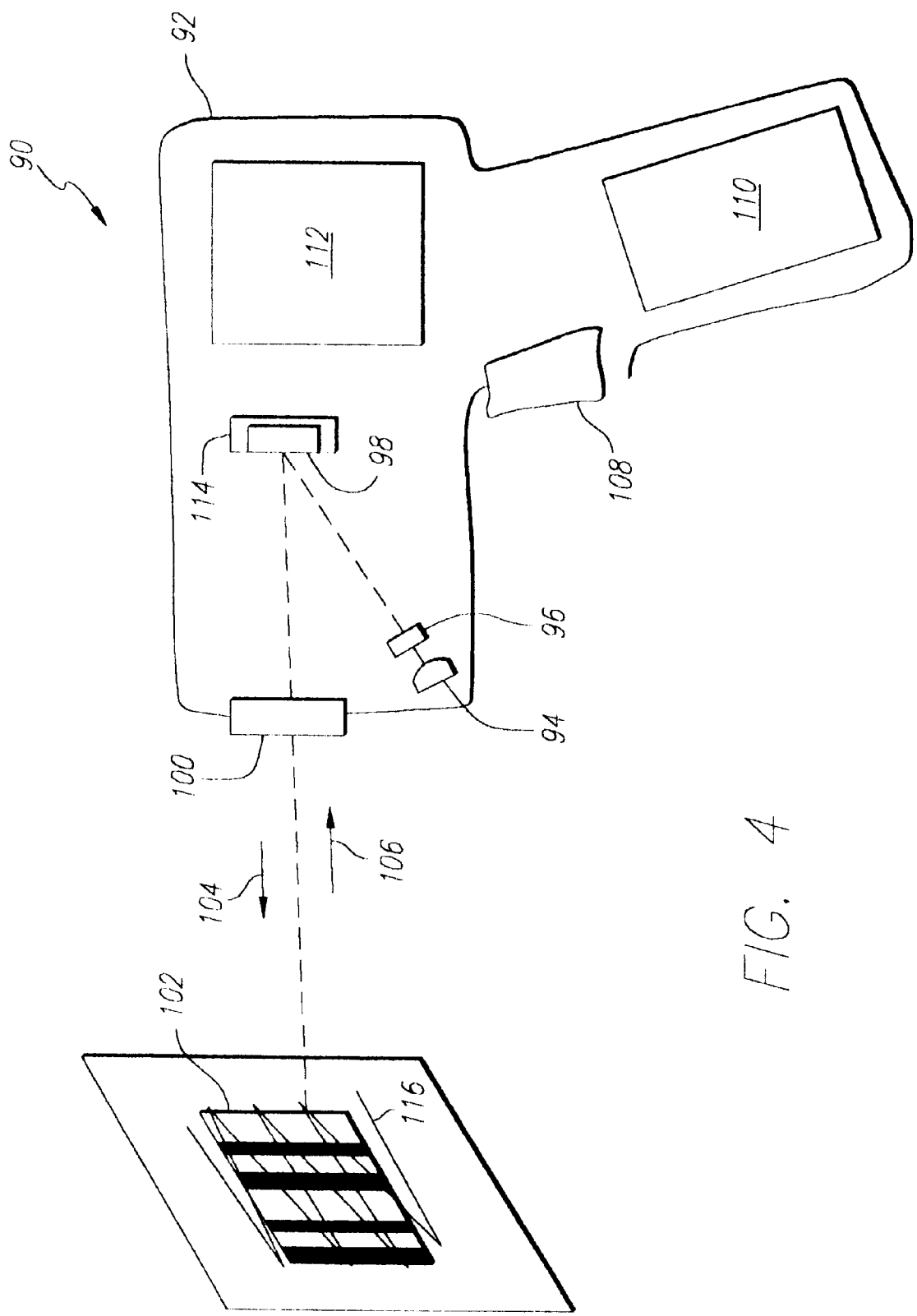
FIG. 4 illustrates a diagram of a laser scanner in accordance with a second embodiment of the present invention.

FIG. 4 illustrates a diagram of a scanner 90 in accordance with a second embodiment of the present invention. The scanner 90 has a housing 92 containing a laser light source 94, a lens 96, a MEMS scanning mirror 98, a laser light detector 114, and a light-transmissive window 100. The lens 96 may or may not be required, depending upon the degree of focus provided by the laser light source 94. The housing 92 also contains a power source 110 and scanner electronics 112. When an operator engages a trigger 108, the laser light source 94 emits a laser light beam 104 that travels through the lens 96, reflects off the MEMS scanning mirror 98, through the light-transmissive window 100, to a bar code symbol 102. The MEMS scanning mirror 98, as it oscillates, causes the laser light beam 104 to trace a scan pattern 116 across the bar code symbol 102. A laser light beam 106 is reflected from the bar code symbol 102, through the light-transmissive window 100, to the laser light detector 114. The laser light detector 114 converts the laser light beam 106 into electrical signals for processing by the scanner electronics 112.

As can be seen, the partially-silvered mirror 68 is no longer required due to the repositioning of the laser light detector 114 next to the MEMS scanning mirror 98. By placing the MEMS scanning mirror 98 within or central to the laser light detector 114, the associated signal-to-noise ratio is improved. Although the laser light detector 114 is shown surrounding the MEMS scanning mirror 98, it is not limited to this configuration. The laser light detector 114 can be positioned adjacent to, or in close proximity to, the MEMS scanning mirror 98. The two devices can be manufactured separately, or as one integrated device that could also be incorporated into the scanner electronics 112.

The MEMS scanning mirror 98 may be designed and operated in a similar fashion as described with reference to the MEMS scanning mirror 70. The MEMS scanning mirror, in accordance with an embodiment of the present invention, may be fabricated using integrated circuit techniques such as surface micromachining. Alternative fabrication techniques also exist such as bulk micromachining, LIGA (a German acronym referring to lithography, electroforming, and injection molding), or LIGA-like machining, as known in the art. Additional fabrication techniques such as chemical-mechanical polishing may be performed to improve the optical quality of the mirrored surface by reducing the surface roughness. Furthermore, the preferred material would be polysilicon with the number of levels required dependent upon the degree of complexity chosen in causing the MEMS scanning mirror to oscillate. For example, a four-level polysilicon MEMS scanning mirror may be preferred for complex designs.

Having thus described a preferred embodiment of the MEMS scanning mirror for a laser scanner, it should be apparent to those skilled in the art that certain advantages of the within system have been achieved. It should also be appreciated that various modifications, adaptations, and alternative embodiments thereof may be made within the scope and spirit of the present invention. For example, a laser scanner for bar code symbols has been illustrated to show an embodiment of the present invention, but it should be apparent that the inventive concepts described above would be equally applicable to various other types of scanners and imagers, as known in the art. The invention is further defined by the following claims.

What is claimed is:

1. A light beam scanner, comprising:
   a light source providing a beam of light;
   a MEMS mirror spaced from said light source and having a reflective surface that reflects said beam of light, said MEMS mirror comprising a resonant transducer that oscillates;
   a partially-reflective mirror disposed between said light source and said MEMS mirror, said partially-reflective mirror permitting said beam of light to pass therethrough and travel from said light source to said MEMS mirror, said partially-reflective mirror substantially reflecting any reflected light returning from said MEMS mirror towards said light source; and a light detector spaced from said partially-reflective mirror to receive said reflected light from said partially-reflective mirror.

2. The scanner of claim 1, further comprising a light source lens disposed between said light source and said partially-reflective mirror, said light source lens providing additional focusing for said beam of light.

3. The scanner of claim 1, further comprising a light-transmissive window spaced from said MEMS mirror, said light-transmissive window providing light to be substantially transmitted therethrough.

4. The scanner of claim 1, wherein said reflective surface of said MEMS mirror comprises a 0.3 mm silvered surface.

5. The scanner of claim 1, wherein said light source comprises a semiconductor laser.

6. The scanner of claim 1, wherein said oscillating means is controlled by a DC voltage source.

7. The scanner of claim 1, wherein said MEMS mirror oscillates in one direction at a controlled rate.

8. The scanner of claim 1, wherein said MEMS mirror oscillates in a first direction at a first rate and in a second direction at a second rate that is substantially higher than said first rate, thereby providing a scan pattern.

9. The scanner of claim 1, further comprising electronics providing signal processing and control functions, wherein said MEMS mirror comprises a portion of said electronics.

10. The scanner of claim 1, wherein said MEMS mirror comprises polysilicon material.

11. The scanner of claim 1, wherein chemical-mechanical polishing provides said reflective surface of said MEMS mirror.

12. A light beam scanner, comprising:

a light source providing a beam of light;

a MEMS mirror spaced from said light source and having a reflective surface that reflects said beam of light, said MEMS mirror comprising a resonant transducer that oscillates;

a light-transmissive window spaced from said MEMS mirror with said beam of light reflected from said reflective surface of said MEMS mirror being substantially transmitted therethrough; and a light detector spaced from said light-transmissive window and receiving reflected light transmitted therethrough.

13. The scanner of claim 12, wherein said light detector is disposed adjacent to said MEMS mirror.

14. The scanner of claim 12, wherein said light detector is disposed centrally around said MEMS mirror.

15. The scanner of claim 12, further comprising a light source lens disposed between said light source and said MEMS mirror, said light source lens providing additional focusing for said beam of light.

16. The scanner of claim 12, wherein said reflective surface of said MEMS mirror comprises a 0.3 mm silvered surface.

17. The scanner of claim 12, wherein said light source comprises a semiconductor laser.

18. The scanner of claim 12, wherein said oscillating means is controlled by a DC voltage source.

19. The scanner of claim 12, wherein said MEMS mirror oscillates in one direction at a controlled rate.

20. The scanner of claim 12, wherein said MEMS mirror oscillates in a first direction at a first rate and in a second direction at a second rate that is substantially higher than said first rate, thereby providing a scan pattern.

21. The scanner of claim 12, further comprising electronics providing signal processing and control functions, wherein said MEMS mirror and said light detector comprise a portion of said electronics.

22. The scanner of claim 12, wherein said MEMS mirror comprises polysilicon material.

23. The scanner of claim 12, wherein chemical-mechanical polishing provides said reflective surface of said MEMS mirror.

24. A method of generating a scanning beam of light comprising the steps of:

providing a beam of light;

reflecting said beam of light off a MEMS resonant transducer, having a reflective surface and oscillating at a controlled rate by application of a DC voltage, and through a light-transmissive window to an area of interest; and receiving reflected light from said area of interest.

25. The method of claim 24, wherein said reflecting step further comprises the step of oscillating said MEMS resonant transducer in a first direction at a first rate and in a second direction at a second rate that is substantially higher than said first rate, thereby providing a two-dimensional scan pattern.

* * * * *